(12) United States Patent
Zhou

(10) Patent No.: US 11,212,521 B2
(45) Date of Patent: Dec. 28, 2021

(54) CONTROL OF MEMORY BANDWIDTH CONSUMPTION OF AFFINE MODE IN VERSATILE VIDEO CODING

(71) Applicant: Avago Technologies International Sales Pte. Limited, Singapore (SG)

(72) Inventor: Minhua Zhou, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 16/665,484

(22) Filed: Oct. 28, 2019

(65) Prior Publication Data

US 2020/0145650 A1 May 7, 2020

Related U.S. Application Data

(60) Provisional application No. 62/757,004, filed on Nov. 7, 2018, provisional application No. 62/769,875, filed (Continued)

(51) Int. Cl.
*H04N 19/119* (2014.01)
*H04N 19/423* (2014.01)
(Continued)

(52) U.S. Cl.
CPC ......... *H04N 19/105* (2014.11); *H04N 19/122* (2014.11); *H04N 19/159* (2014.11); *H04N 19/176* (2014.11); *H04N 19/51* (2014.11)

(58) Field of Classification Search
CPC .. H04N 19/105; H04N 19/122; H04N 19/159; H04N 19/176; H04N 19/51; H04N 19/577; H04N 19/423; H04N 19/537
See application file for complete search history.

(56) References Cited

U.S. PATENT DOCUMENTS 6,037,988 A * 3/2000 Gu .................. H04N 19/56
375/240.16
6,553,069 B1 * 4/2003 Shin ............... H04N 19/537
375/240.12

(Continued)

FOREIGN PATENT DOCUMENTS

WO 2019/139309 A1 7/2019

OTHER PUBLICATIONS

Lin S., "Affine transform prediction for next gerseratfon video coding", ISO/IEC JTC1/SC29/WG11 MPEG2015/ m37525 Oct. 2015, Geneva, Switzerland (Year: 2015).*

(Continued)

*Primary Examiner* — Philip P. Dang
(74) *Attorney, Agent, or Firm* — Morgan, Lewis & Bockius LLP

(57) ABSTRACT

Video encoding or decoding includes performing affine motion compensation in an affine mode in which a prediction unit ("PU") of the digital video coded in the affine mode uses inter prediction and a reference block bounding box size and determining whether the reference block bounding size exceeds a predefined threshold. In response to a determination that the reference block bounding size exceeds the predefined threshold, the affine motion compensation is performed using a first motion compensation operation. In response to a determination that the reference block bounding size does not exceed the predefined threshold, the affine motion compensation is performed using a second motion compensation operation that is different from the first motion compensation operation.

13 Claims, 13 Drawing Sheets

Related U.S. Application Data on Nov. 20, 2018, provisional application No. 62/792,195, filed on Jan. 14, 2019.

(51) Int. Cl.

| | | |
|---|---|---|
| *H04N 19/577* | (2014.01) | |
| *H04N 19/105* | (2014.01) | |
| *H04N 19/122* | (2014.01) | |
| *H04N 19/159* | (2014.01) | |
| *H04N 19/176* | (2014.01) | |
| *H04N 19/51* | (2014.01) | |

(56) References Cited

U.S. PATENT DOCUMENTS

| | | | | |
|---|---|---|---|---|
| 7,823,083 | B2 * | 10/2010 | Rohrabaugh | H04L 67/04 715/815 |
| 7,924,317 | B2 * | 4/2011 | Lin | H04N 5/23267 348/208.4 |
| 8,073,196 | B2 * | 12/2011 | Yuan | G06T 7/215 382/103 |
| 8,233,701 | B2 * | 7/2012 | Frakes | H04N 19/51 382/154 |
| 8,238,429 | B2 * | 8/2012 | Nagori | H04N 19/433 375/240.16 |
| 8,842,730 | B2 * | 9/2014 | Zhou | H04N 19/537 375/240.12 |
| 9,197,736 | B2 * | 11/2015 | Davis | G10L 15/22 |
| 9,256,806 | B2 * | 2/2016 | Aller | G06Q 30/06 |
| 9,274,742 | B2 * | 3/2016 | Phillips | G06F 9/452 |
| 9,355,293 | B2 * | 5/2016 | Swayn | G06K 7/1417 |
| 9,557,162 | B2 * | 1/2017 | Rodriguez | G01B 11/14 |
| 10,438,349 | B2 * | 10/2019 | Yu | G06T 7/248 |
| 10,448,010 | B2 * | 10/2019 | Chen | H04N 19/139 |
| 10,510,157 | B2 * | 12/2019 | Seyfi | G06K 9/36 |
| 10,560,712 | B2 * | 2/2020 | Zou | H04N 19/513 |
| 10,602,180 | B2 * | 3/2020 | Chen | H04N 19/52 |
| 10,631,002 | B2 * | 4/2020 | Li | H04N 19/52 |
| 10,638,152 | B2 * | 4/2020 | Chuang | H04N 19/423 |
| 2005/0169378 | A1 | 8/2005 | Kim | H04N 19/57 375/240.16 |
| 2012/0242809 | A1 * | 9/2012 | White | H04N 5/332 348/51 |
| 2014/0092439 | A1 * | 4/2014 | Krig | G06T 9/001 358/2.1 |
| 2014/0269923 | A1 * | 9/2014 | Kwon | H04N 19/527 375/240.16 |
| 2015/0024800 | A1 * | 1/2015 | Rodriguez | G06T 19/006 455/556.1 |
| 2018/0077417 | A1 * | 3/2018 | Huang | H04N 19/70 |
| 2018/0098062 | A1 * | 4/2018 | Li | H04N 19/70 |
| 2018/0192069 | A1 * | 7/2018 | Chen | H04N 19/51 |
| 2018/0270500 | A1 * | 9/2018 | Li | H04N 19/54 |
| 2018/0309990 | A1 * | 10/2018 | Alshina | H04N 19/176 |
| 2018/0316918 | A1 * | 11/2018 | Drugeon | H04N 19/176 |
| 2019/0007682 | A1 * | 1/2019 | Kanoh | H04N 19/61 |
| 2019/0037231 | A1 * | 1/2019 | Ikai | H04N 19/52 |
| 2019/0058896 | A1 * | 2/2019 | Huang | H04N 19/176 |
| 2019/0082191 | A1 * | 3/2019 | Chuang | H04N 19/176 |
| 2019/0110061 | A1 * | 4/2019 | Park | H04N 19/513 |
| 2019/0124332 | A1 * | 4/2019 | Lim | H04N 19/137 |
| 2019/0191171 | A1 * | 6/2019 | Ikai | H04N 19/51 |
| 2019/0273943 | A1 * | 9/2019 | Zhao | H04N 19/176 |
| 2019/0335170 | A1 * | 10/2019 | Lee | H04N 19/52 |
| 2019/0342547 | A1 * | 11/2019 | Lee | H04N 19/46 |

OTHER PUBLICATIONS

ITU-T, "Algorithm Description of Joint Exploration Test Model 1", ITU-T SG 16 WP 3 and ISO/IEC JTC 1/SC 29/WG 11 Ind Meeting: Geneva. CH, Oct. 19-21, 2015 (Year: 2015).*

ITU-T H.265 Series H: Audiovisual and Multimedia Systems Infrastructure of audiovisual services—Coding of moving video—High efficiency video coding (Year: 2016).*

CE4.1.3: Affine motion comnensation prediction, JVET-K0337 (Year: 2018).*

Li g. , CE4-1 •elated: affine merge mode with prediction offsets, JVET-L0320 (Year: 2018).*

Chen H. CE4: Common base for affine merge mode (Test 4.2.1), JVET-L0366-v1 (Year: 2018).*

Chang Y-C, CE4-1 •elated: Control point I\,IV offset for Affine merge mode, JVET-L0389-v1 (Year: 2018).*

T-D Chuang et al: "CE 9 .2.1: Bilateral matching merge mode". 11. JVET Meeting; Jul. 11, 2018-Jul. 18, 2018; Ljubljana; (The Joint Video Exploration Team of ISO/IEC JTC1/SC29/WG11 and ITU-T SG.16 ), No. JVET-K0254 Jul. 10, 2018 (Jul. 10, 2018), XP030199311 , Retrieved from the Internet: URL:http://phenix.int-evry.fr/jvet/doc end user/documents/11 Ljubljana/wgll/JVET?K02 54 -v2.zip JVET-K0254-vl.docx [retrieved on Jul. 10, 2018.

Zhou (Broadcom) M: "CE2-related: A restriction on memory bandwidth consumption of affine mode". 125. MPEG Meeting; Jan. 14, 2019-Jan. 18, 2019; Arrakec H; (Motion Picture Expert Group or MISO/IEC JTC1/SC29/WG11), No. m45303 Dec. 28, 2018 (Dec. 28, 2018), XP 030197660 , Retrieved from the Internet: URL:http ://phenix.int-evry.fr/mpeg/doc end user/documents/125 Marrakech/wgll/m4 5303-JVET- M004 9-vl -JVET-M0 049 -vl.zip JVET-M0 049 -vl.docx [retrieved on Dec. 28, 2018].

He (Interdigital) Yet al: "Description 1-15 of Core Experiment 2 (CE2): Sub-block based motion prediction", 12. JVET Meeting; Oct. 3, 2018-Oct. 12, 2018;Macao; (The Joint Video Exploration Teamof ISO/IEC JTC1/SC29/WG11 and ITU-T SG.16), No. JVET-LI022 Nov. 3, 2018 (Nov. 3, 2018), XP030198596, Retrieved from the Internet: URL:http://phenix.int-evry.fr/jvet/doc end user/documents/12 Macao/wgll/JVET-L1022-v 2.zip JVET-LI022-v2-clean.docx [retrieved on Nov. 3, 2018].

Extended European Search Report dated Mar. 4, 2020, issued in corresponding European Patent Application No. 19207520.8-1208.

\* cited by examiner

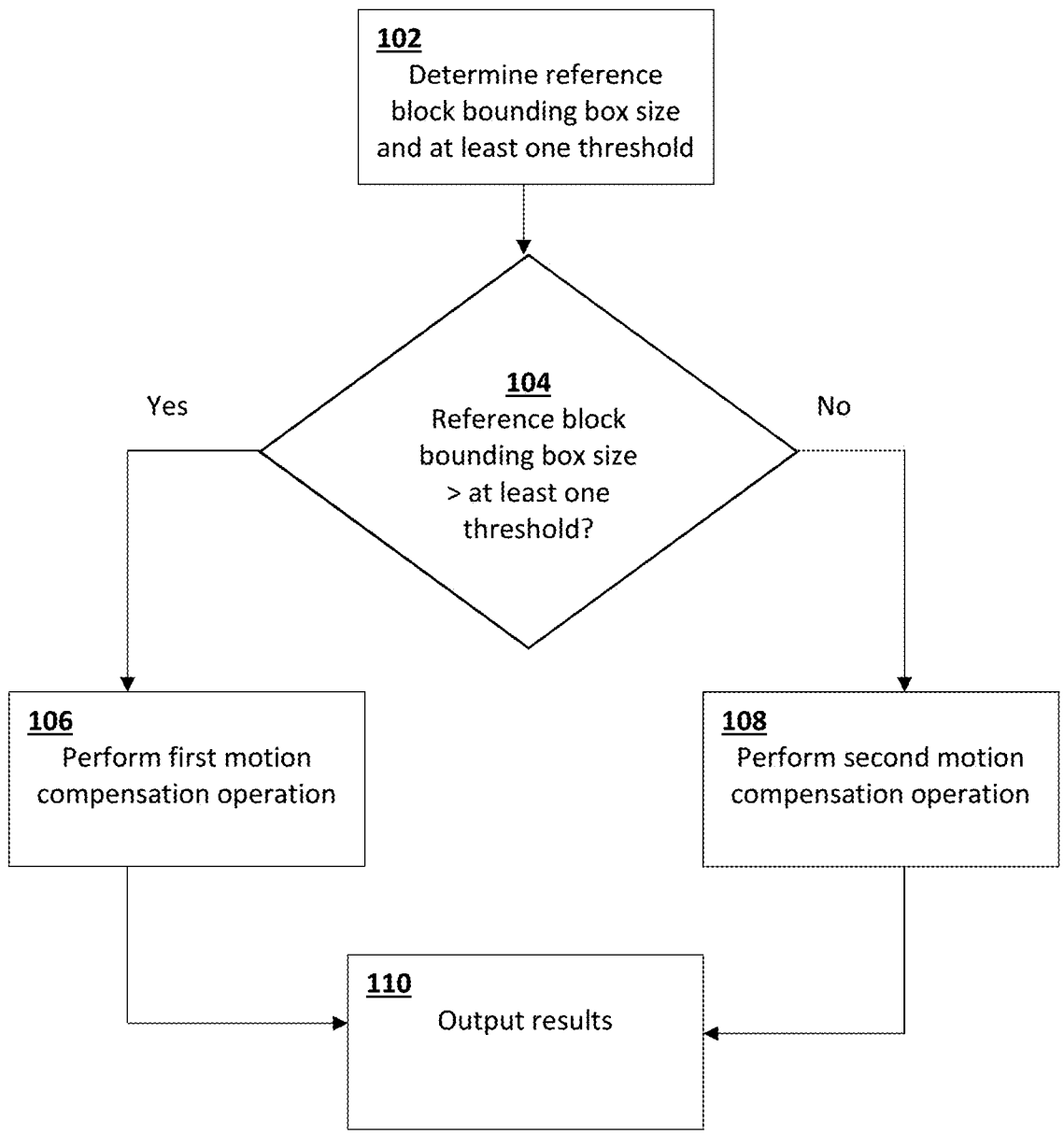

CONTROL OF MEMORY BANDWIDTH CONSUMPTION OF AFFINE MODE IN VERSATILE VIDEO CODING

CROSS-REFERENCES TO RELATED APPLICATIONS

The present application claims the benefit of U.S. Provisional Patent Application Nos. 62/757,004, filed Nov. 7, 2018; 62/769,875, filed Nov. 20, 2018, and 62/792,195, filed Jan. 14, 2019, whose disclosures are hereby incorporated by reference in their entireties into the present disclosure.

BACKGROUND

1. Field

One or more aspects of the disclosed subject matter are directed to video encoding or decoding and more specifically to video encoding or decoding with memory bandwidth conservation when an affine motion model is used.

2. Description of Related Art

The VVC (Versatile Video Coding) is a new video compression standard being developed by the joint video experts team (JVET) jointly established by ISO/IEO MPEG and ITU-T. The VVC standard for single layer coding will be finalized by the end of 2020, with a design goal of being at least 50% more efficient than the previous standard MPEG HEVC/ITU-T H.265 Main-10 profile.

Among proposed coding tools to VVC under consideration, the affine motion compensation prediction introduces a more complex motion model for better compression efficiency. In previous standards such as HEVC, only a translational motion model is considered, in which all the sample positions inside a PU (prediction unit) may have a same translational motion vector for motion compensated prediction. However, in the real world, there are many kinds of motion, e.g., zoom in/out, rotation, perspective motions and other irregular motions. The affine motion model supports different motion vectors at different sample positions inside a PU, which effectively captures more complex motion. Different sample positions inside a PU, such as four corner points of the PU, may have different motion vectors as supported by the affine mode. A PU coded in affine mode and affine merge mode may have uni-prediction (list 0 or list 1 prediction) or bi-directional prediction (i.e. list 0 and list 1 bi-prediction).

In the current VVC design (see JVET-P2001, "Versatile Video Coding (Draft 7)"), the sub-block size for the affine mode is fixed to 4×4, which creates the 4×4 bi-directional prediction for the worst-case memory bandwidth consumption of motion compensation. In the HEVC, the worst-case memory bandwidth consumption for motion compensation is 8×8 bidirectional prediction, while 8×4 and 4×8 PUs use uni-prediction only. The increased memory bandwidth budget can never catch up with the path of sample rate increase (e.g., HEVC is typically for 4K video at 60 fps, while VVC will be used for 8K video at 60 fps, another factor of 4 increase in terms of sample processing rate).

BRIEF DESCRIPTION OF THE DRAWINGS

One or more aspects of the disclosed subject matter will be set forth in detail with reference to the drawings, in which:

The present application claims the benefit of U.S. Provisional Patent Application Nos. 62/757,004, filed Nov. 7, 2018; 62/769,875, filed Nov. 20, 2018, and 62/792,195, filed Jan. 14, 2019, whose disclosures are hereby incorporated by reference in their entireties into the present disclosure.

FIG. 1A is a flow chart showing an overview of one or more aspects of the disclosed subject matter;

DETAILED DESCRIPTION

Figure 1B:
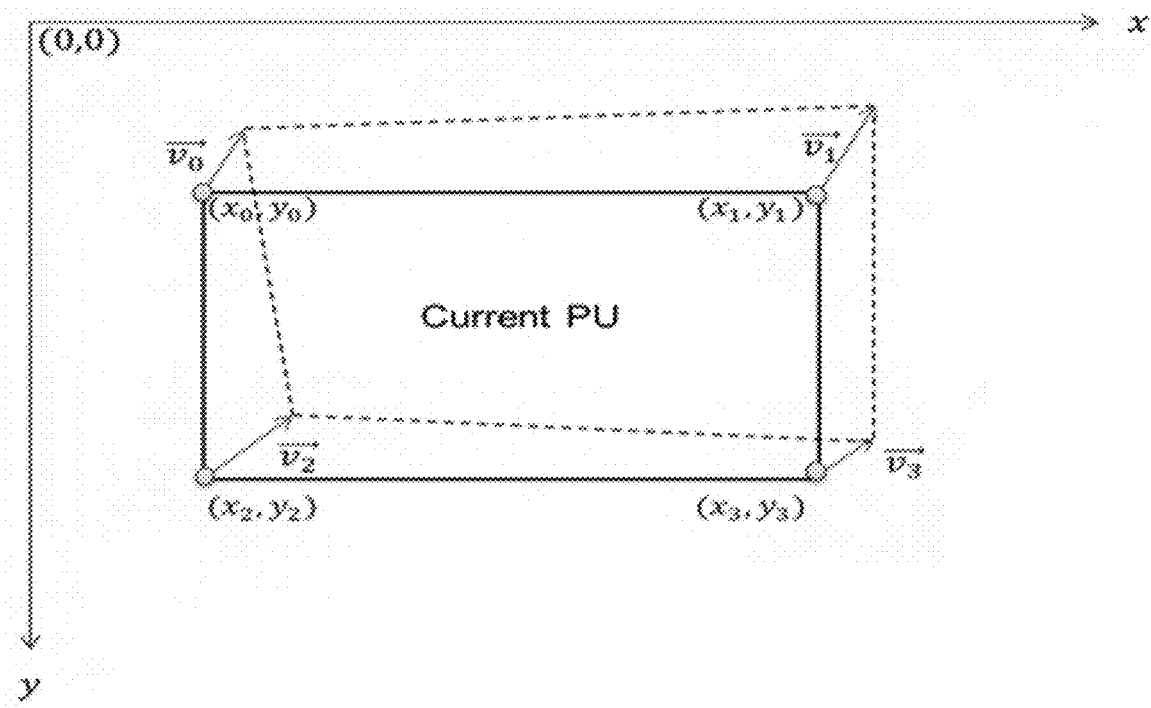
FIG. 1B illustrates an affine motion model according to one or more aspects of the disclosed subject matter.

The description set forth in detail with reference to the drawings, in which like reference numerals refer to like elements or operations throughout.

FIG. 1A is a flow chart showing an overview of one or more aspects of the disclosed subject matter. In step 102, the reference block bounding box size and at least one threshold are determined. In step 104, it is determined whether the reference block bounding box size exceeds the at least one threshold. If so, the affine motion compensation is performed in step 106 using a first motion compensation operation. In response to a determination that the reference block bounding size does not exceed the predefined threshold, the affine motion compensation is performed in step 108 using a second affine motion compensation operation that is different from the first motion compensation operation. Either way, the results are output in step 110.

Figure 1C:
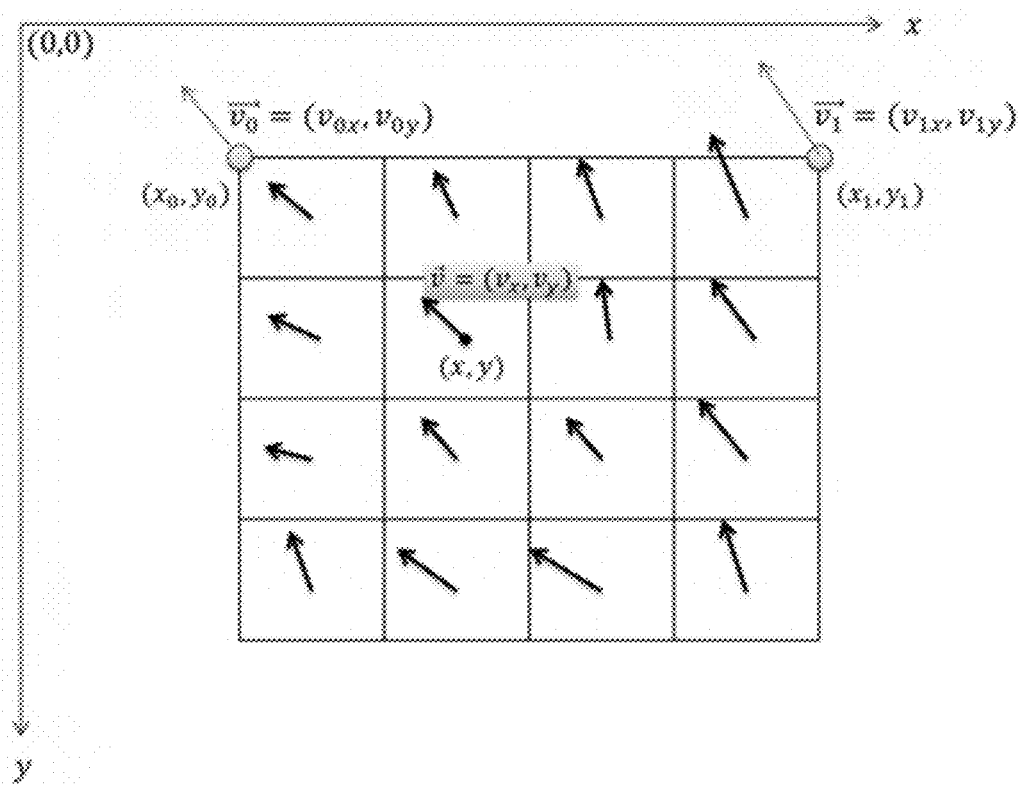
FIG. 1C depicts a 4-parameter affine motion model used in the VVC according to one or more aspects of the disclosed subject matter.
Figure 1D:
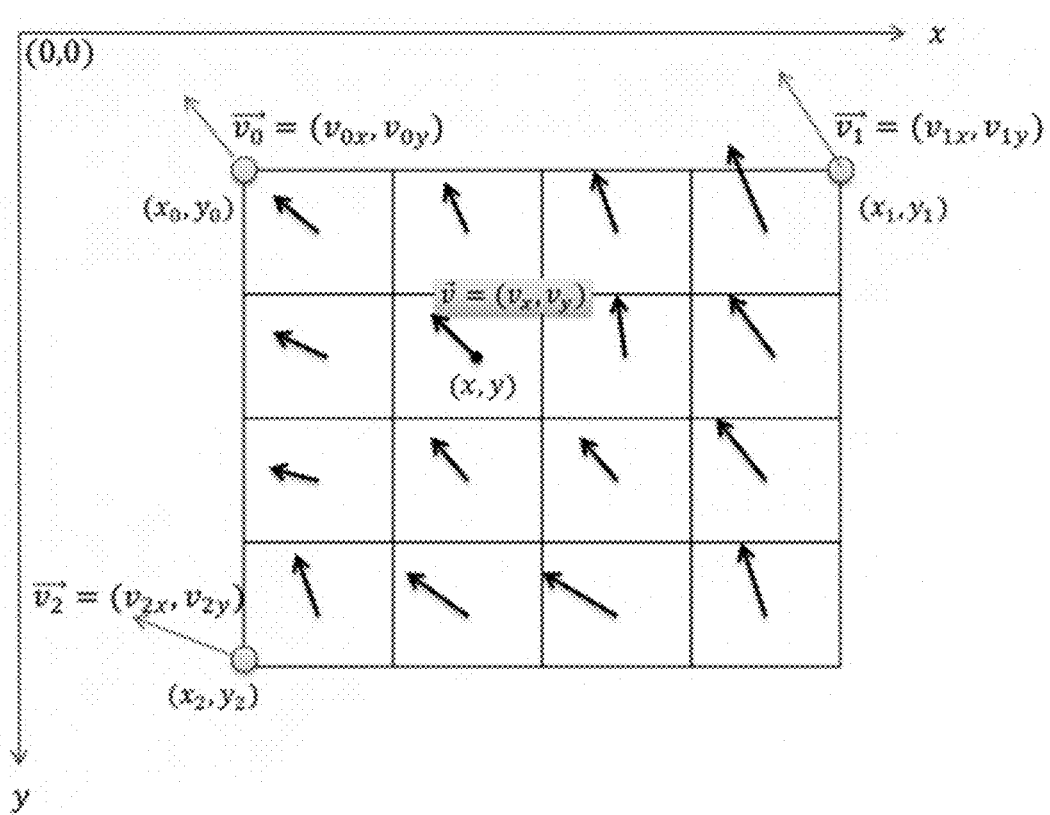
FIG. 1D depicts a 6-parameter affine motion model used in the VVC according to one or more aspects of the disclosed subject matter.

FIG. 1B shows an affine motion model according to one or more aspects of the disclosed subject matter. Regarding the affine motion model, the origin (0, 0) of the x-y coordinate system can be at the top-left corner point of a picture as illustrated in FIG. 1B. Similarly, other drawings in the description having an x-y coordinate system can also have the origin (0, 0) of the x-y coordinate at the top-left corner of a picture. Generally, a PU coded in affine mode and affine merge mode can have uni-prediction or bi-directional prediction. The uni-prediction can correspond to a list 0 or list 1 prediction, while the bi-directional prediction can correspond to a list 0 and list 1 bi-prediction. Although various algorithmic descriptions further described herein focus on the uni-prediction mode to explain the algorithm, it should be appreciated that if a PU is coded in bi-directional affine or bi-directional affine merge mode, the process of affine mode and affine merge mode described herein are performed separately for list 0 and list 1 predictions. In the affine motion model, the motion vector $\vec{v}=(v_x, v_y)$ at a sample position (x, y) inside a PU is defined as follows:

$$\begin{cases} v_x = ax + cy + e \\ v_y = bx + dy + f \end{cases} \quad \text{Equation 1}$$

where a, b, c, d, e, f are the affine motion model parameters, which define a 6-parameter affine motion model (see FIG. 1D).

FIG. 1C shows a 4-parameter affine motion model according to one or more aspects of the disclosed subject matter. The 4-parameter affine motion model can be a restricted affine motion model because the parameters are restricted. For example, the 4-parameter model can be described with four parameters by restricting a=d and b=−c in Equation 1:

$$\begin{cases} v_x = ax - by + e \\ v_y = bx + ay + f \end{cases} \quad \text{Equation 2}$$

In the 4-parameter affine motion model, the model parameters a, b, e, f are determined by signaling two control point vectors at the top-left and top-right corner of a PU. FIG. 1C shows two control point vectors $\vec{v_0}=(v_{0x}, v_{0y})$ at sample position $(x_0, y_0)$ and $\vec{v_1}=(v_{1x}, v_{1y})$ at sample position $(x_1, y_1)$. Accordingly, Equation 2 can be rewritten as:

$$\begin{cases} v_x = \frac{(v_{1x} - v_{0x})}{(x_1 - x_0)}(x - x_0) - \frac{(v_{1y} - v_{0y})}{(x_1 - x_0)}(y - y_0) + v_{0x} \\ v_y = \frac{(v_{1y} - v_{0y})}{(x_1 - x_0)}(x - x_0) + \frac{(v_{1x} - v_{0x})}{(x_1 - x_0)}(y - y_0) + v_{0y} \end{cases} \quad \text{Equation 3}$$

It should be appreciated that in FIG. 1C, $(x_1-x_0)$ is equal to the PU width and $y_1=y_0$. Accordingly, the two control point vectors do not have to be at the top-left and top-right corner of a PU to derive the parameters of the 4-parameter affine motion model. As long as the two control points have $x_1 \neq x_0$ and $y_1=y_0$, Equation 3 is valid.

FIG. 1D shows a 6-parameter affine motion model according to one or more aspects of the disclosed subject matter. The model parameters for the 6-parameter affine motion model can be determined by signaling three control point vectors at the top-left, top-right, and bottom-left corner of a PU. For example, with three control point vectors $\vec{v_0}=(v_{0x}, v_{0y})$ at sample position $(x_0, y_0)$, $\vec{v_1}=(v_{1x}, v_{1y})$ at sample position $(x_1, y_1)$ and $\vec{v_2}=(v_{2x}, v_{2y})$ at sample position $(x_2, y_2)$, Equation 1 can be rewritten as:

$$\begin{cases} v_x = \frac{(v_{1x} - v_{0x})}{(x_1 - x_0)}(x - x_0) + \frac{(v_{2x} - v_{0x})}{(y_2 - y_0)}(y - y_0) + v_{0x} \\ v_y = \frac{(v_{1y} - v_{0y})}{(x_1 - x_0)}(x - x_0) + \frac{(v_{2y} - v_{0y})}{(y_2 - y_0)}(y - y_0) + v_{0y} \end{cases} \quad \text{Equation 4}$$

It should be appreciated that in FIG. 1D, $(x_1-x_0)$ is equal to the PU width, $(y_2-y_0)$ is equal to the PU height, $y_1=y_0$, and $x_2=x_0$. Accordingly, the three control point vectors do not have to be at the top-left, top-right and bottom-left corner of a PU as shown in FIG. 1D to derive the parameters of the 6-parameter affine motion model. As long as the three control points have $x_1 \neq x_0$, $y_2 \neq y_0$, $y_1=y_0$ and $x_2=x_0$, Equation 4 is valid.

Further, to constrain the memory bandwidth consumption of the affine mode for motion compensation, the motion vectors of a PU coded in affine mode are not derived for each sample in a PU. For example, as shown in FIG. 1C and FIG. 1D, all the samples inside a sub-block (e.g. 4×4 block size) of the PU can share a same motion vector. Deriving the motion vector can be based on a sub-block motion data derivation process of the affine mode where the motion vector is derived at sample position (x, y) chosen for the sub-block and by using Equation 3 or Equation 4, and whether to use Equation 3 or Equation 4 depends on the type of affine motion model. In the current VVC design, the sub-block size is fixed to 4×4 and the sample position chosen for deriving the sub-block motion vector field of a PU coded in affine mode is the center point of each 4×4 sub-block of the PU.

Figure 2:
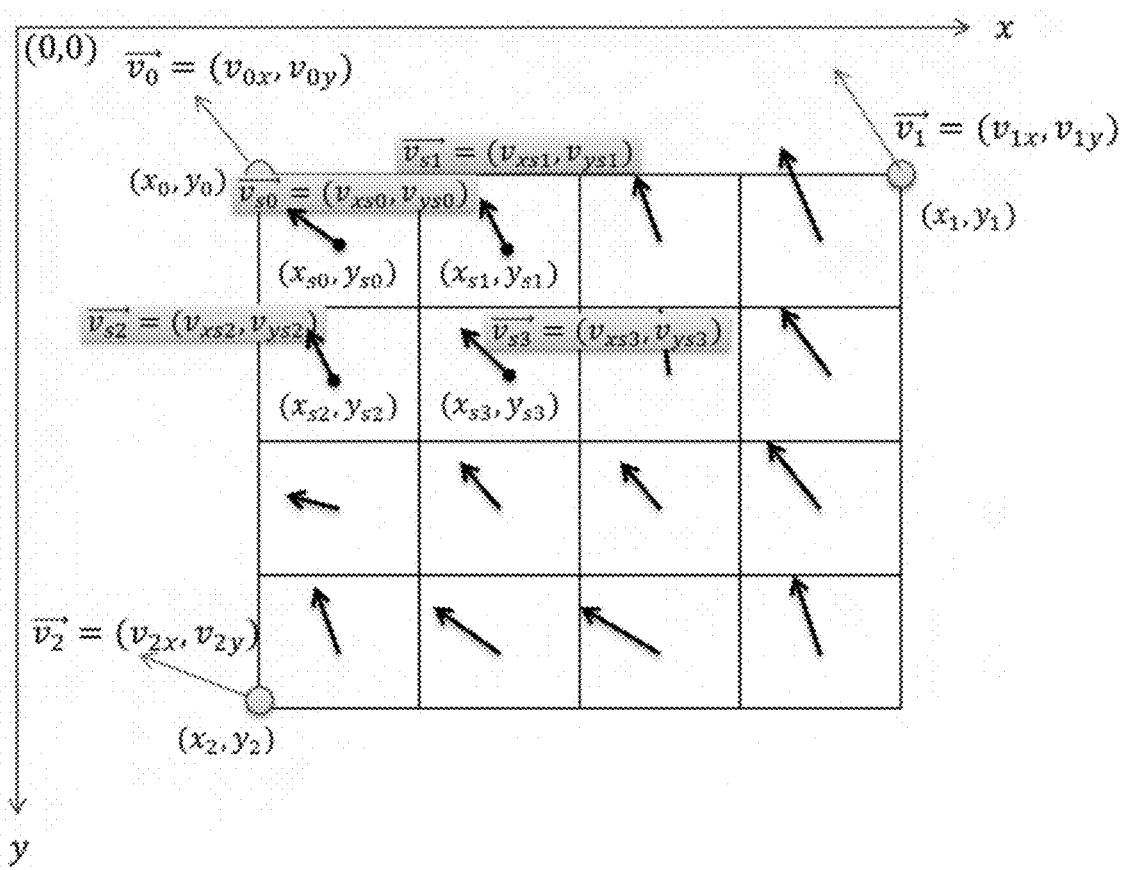
FIG. 2 shows 4 (i.e. 2×2) sub-block motion vectors in a PU coded in affine mode and bi-directional inter prediction.

The concepts of determining the reference block bounding size will be described. FIG. 2 shows 4 (i.e. 2×2) sub-block motion vectors in a PU coded in affine mode and bi-directional inter prediction and depicts the geometric relationship of 4 sub-block vectors in a PU coded in affine mode and bi-directional inter prediction. The 4 sub-block vectors (with sub-block size m*n) can be any 4 sub-block vectors within the PU whose locations satisfy the following conditions:

$$\begin{cases} x_{s1} = x_{s0} + m \\ y_{s1} = y_{s0} \\ x_{s2} = x_{s0} \\ y_{s2} = y_{s0} + n \\ x_{s3} = x_{s0} + m \\ y_{s3} = y_{s0} + n \end{cases} \quad \text{Equation 5}$$

By substituting Equation 5 into the affine motion model, the 4 sub-block vectors are be derived by $$\begin{cases} v_{xs0} = ax_{s0} + cy_{s0} + e \\ v_{ys0} = bx_{s0} + dy_{x0} + f \end{cases} \quad \text{Equation 6}$$

$$\begin{cases} v_{xs1} = v_{xs0} + am \\ v_{ys1} = v_{ys0} + bm \end{cases} \quad \text{Equation 7}$$

$$\begin{cases} v_{xs2} = v_{xs0} + cn \\ v_{ys2} = v_{ys0} + dn \end{cases} \quad \text{Equation 8}$$

$$\begin{cases} v_{xs3} = v_{xs0} + am + cn \\ v_{ys3} = v_{ys0} + bm + dn \end{cases} \quad \text{Equation 9}$$

The parameters of the affine motion model, i.e. (a, b, c d), can be calculated in any suitable way such as using Equation 3 or 4.

Figure 3:
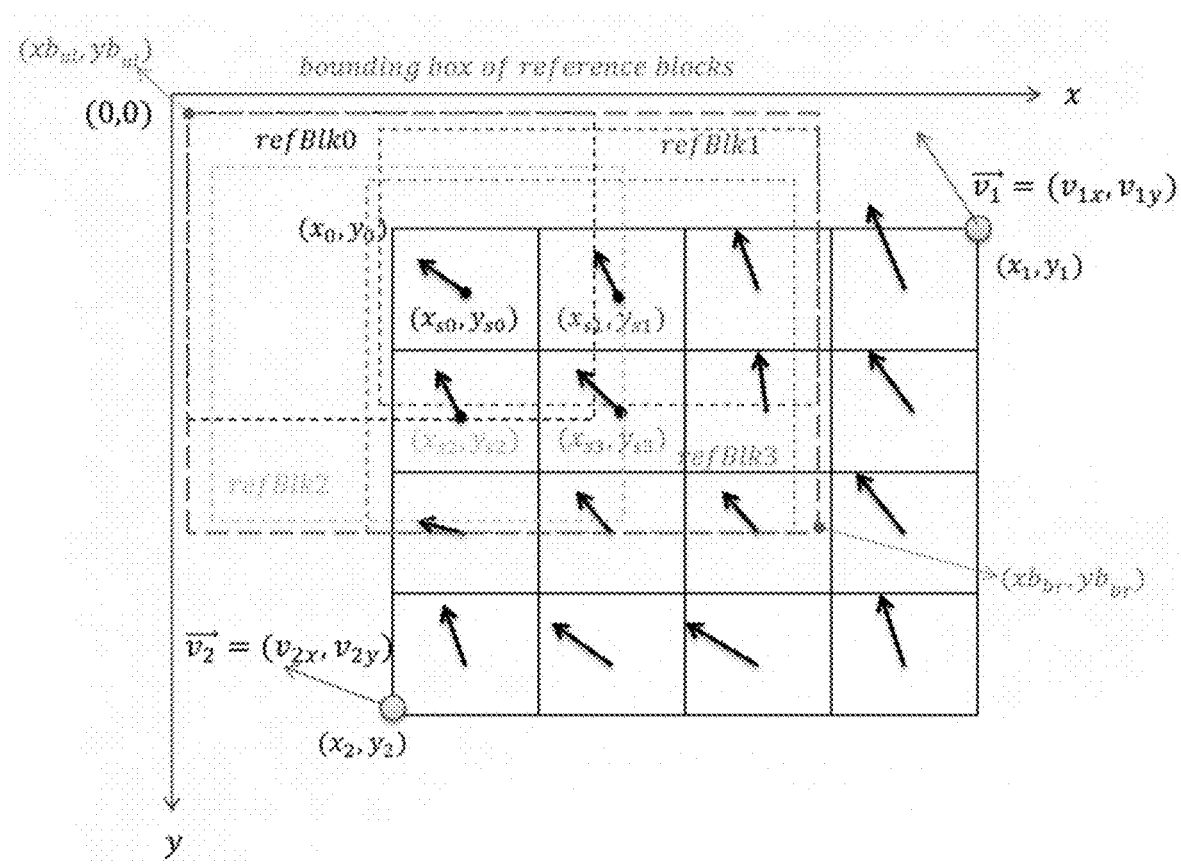
FIG. 3 shows a reference block bounding box of 4 sub-block motion vectors in a PU coded in affine mode and bi-directional inter prediction.

For motion compensation, reference blocks are loaded around the co-located sub-block locations with the offsets determined by the sub-block motion vectors. FIG. 3 shows a reference block bounding box of 4 sub-block motion vectors in a PU coded in affine mode and bi-directional inter prediction. Assuming $(x_0, y_0)$ are the coordinate of the sub-block 0 in FIG. 3 and all the sub-blocks in the PU have equal size m*n, and $f_x*f_y$ are filter taps used in the motion compensation, the coordinates of upper-left and bottom-right locations of the reference blocks are listed in Table 1 below (using Equations 7 to 9):

TABLE 1

Coordinates of upper-left and bottom-right corners of reference blocks of four sub-block vectors

| Sub-block | Coordinates of upper-left corner of the sub-block | Coordinates of upper-left corner of the reference block | Coordinates of bottom-right corner of the reference block |
|---|---|---|---|
| 0 | $(x_0, y_0)$ | $\left(x_0 + v_{xs0} - \frac{f_x}{2} + 1, y_0 + v_{ys0} - \frac{f_y}{2} + 1\right)$ | $\left(x_0 + v_{xs0} + \frac{f_x}{2} + m, y_0 + v_{ys0} + \frac{f_y}{2} + n\right)$ |
| 1 | $(x_0 + m, y_0)$ | $\left((1+a)m + \left(x_0 + v_{xs0} - \frac{f_x}{2} + 1\right), bm + \left(y_0 + v_{ys0} - \frac{f_y}{2} + 1\right)\right)$ | $\left((1+a)m + \left(x_0 + v_{xs0} + \frac{f_x}{2} + m\right), bm + \left(y_0 + v_{ys0} + \frac{f_y}{2} + n\right)\right)$ |
| 2 | $(x_0, y_0 + n)$ | $\left(cn + \left(x_0 + v_{xs0} - \frac{f_x}{2} + 1\right), (1+d)n + \left(y_0 + v_{ys0} - \frac{f_y}{2} + 1\right)\right)$ | $\left(cn + \left(x_0 + v_{xs0} + \frac{f_x}{2} + m\right), (1+d)n + \left(y_0 + v_{ys0} + \frac{f_y}{2} + n\right)\right)$ |
| 3 | $(x_0 + m, y_0 + n)$ | $\left((1+a)m + cn + \left(x_0 + v_{xs0} - \frac{f_x}{2} + 1\right), bm + (1+d)n + \left(y_0 + v_{ys0} - \frac{f_y}{2} + 1\right)\right)$ | $\left((1+a)m + cn + \left(x_0 + v_{xs0} + \frac{f_x}{2} + m\right), bm + (1+d)n + \left(y_0 + v_{ys0} + \frac{f_y}{2} + n\right)\right)$ |

Based on the coordinates listed in Table 1, the coordinates of upper-left and bottom-right corners of the reference block bounding box in FIG. 3, i.e. $(xb_{ul}, yb_{ul})$ and $(xb_{br}, yb_{br})$, are defined as:

$$\begin{cases} xb_{ul} = \min(0, (1+a)m, cn, (1+a)m + cn) + \left(x_0 + v_{xs0} - \frac{f_x}{2} + 1\right) \\ yb_{ul} = \min(0, bm, (1+d)n, bm + (1+d)n) + \left(y_0 + v_{ys0} - \frac{f_x}{2} + 1\right) \end{cases} \quad \text{Equation 10}$$

$$\begin{cases} xb_{br} = \max(0, (1+a)m, cn, (1+a)m + cn) + \left(x_0 + v_{xs0} + \frac{f_x}{2} + m\right) \\ yb_{br} = \max(0, bm, (1+d)n, bm + (1+d)n) + \left(y_0 + v_{ys0} + \frac{f_y}{2} + n\right) \end{cases} \quad \text{Equation 11}$$

where max( ) and min( ) are functions used to return the largest and the smallest value from a set of data, respectively.

By using Equations 6 and 7, the width and height of the reference block bounding box, i.e. (bxW4, bxH4) can be computed by:

$$\begin{cases} bxW4 = \max(0, (1+a)m, cn, (1+a)m + cn) - \\ \quad \min(0, (1+a)m, cn, (1+a)m + cn) + f_x + m - 1 \\ bxH4 = \max(0, bm, (1+d)n, bm + (1+d)n) - \\ \quad \min(0, bm, (1+d)n, bm + (1+d)n) + f_y + n - 1 \end{cases} \quad \text{Equation 12}$$

Figure 4:
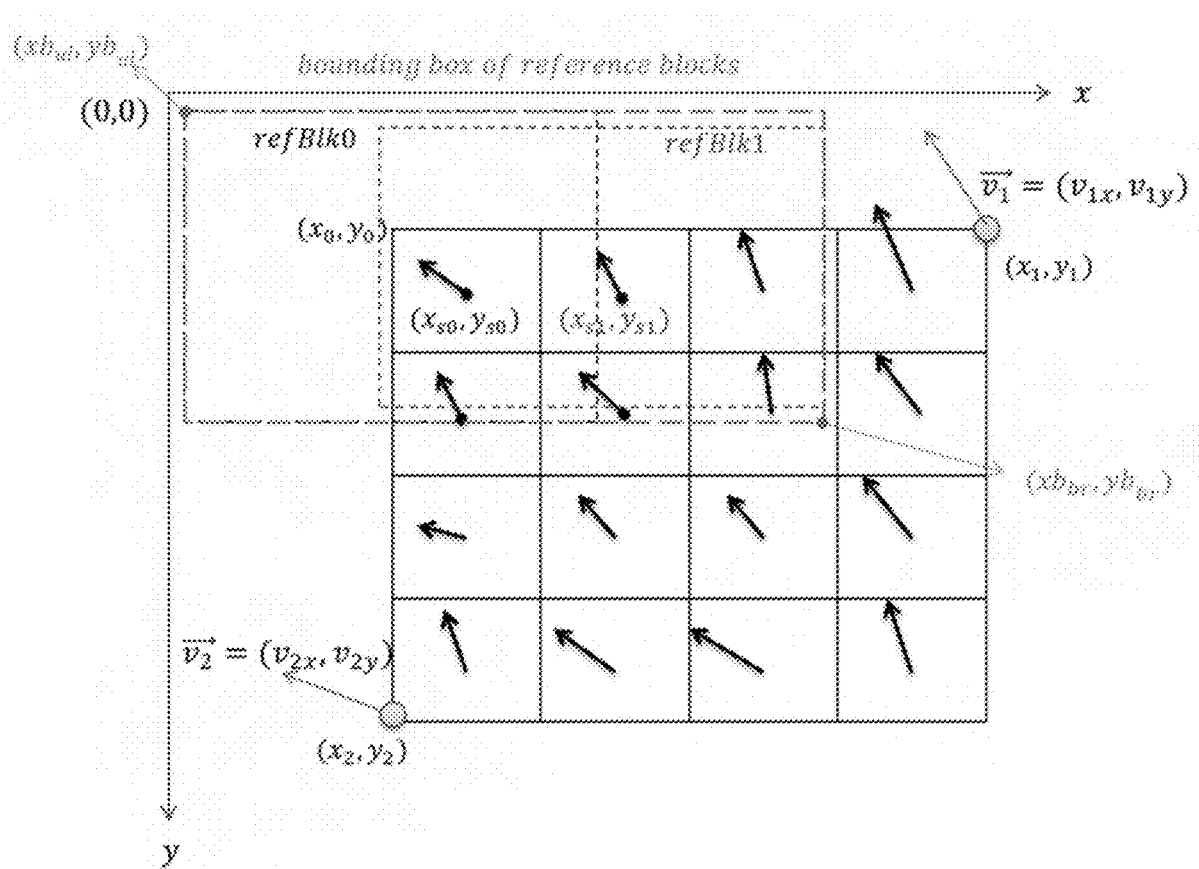
FIG. 4 shows a reference block bounding box of 2 sub-block motion vectors in a PU coded in affine mode and unidirectional inter prediction (horizontal direction)

FIG. 4 shows a reference block bounding box of 2 sub-block motion vectors in a PU coded in affine mode and unidirectional inter prediction (horizontal direction). The width and height of the reference block bounding box $(bxW_h, bxH_h)$ for 2 sub-block motion vectors in a PU, which is coded in affine mode and unidirectional inter prediction, can be computed by:

$$\begin{cases} bxW_h = \max(0, (1+a)m) - \min(0, (1+a)m) + f_x + m - 1 \\ bxH_h = \max(0, bm) - \min(0, bm) + f_y + n - 1 \end{cases} \quad \text{Equation 13}$$

Figure 5:
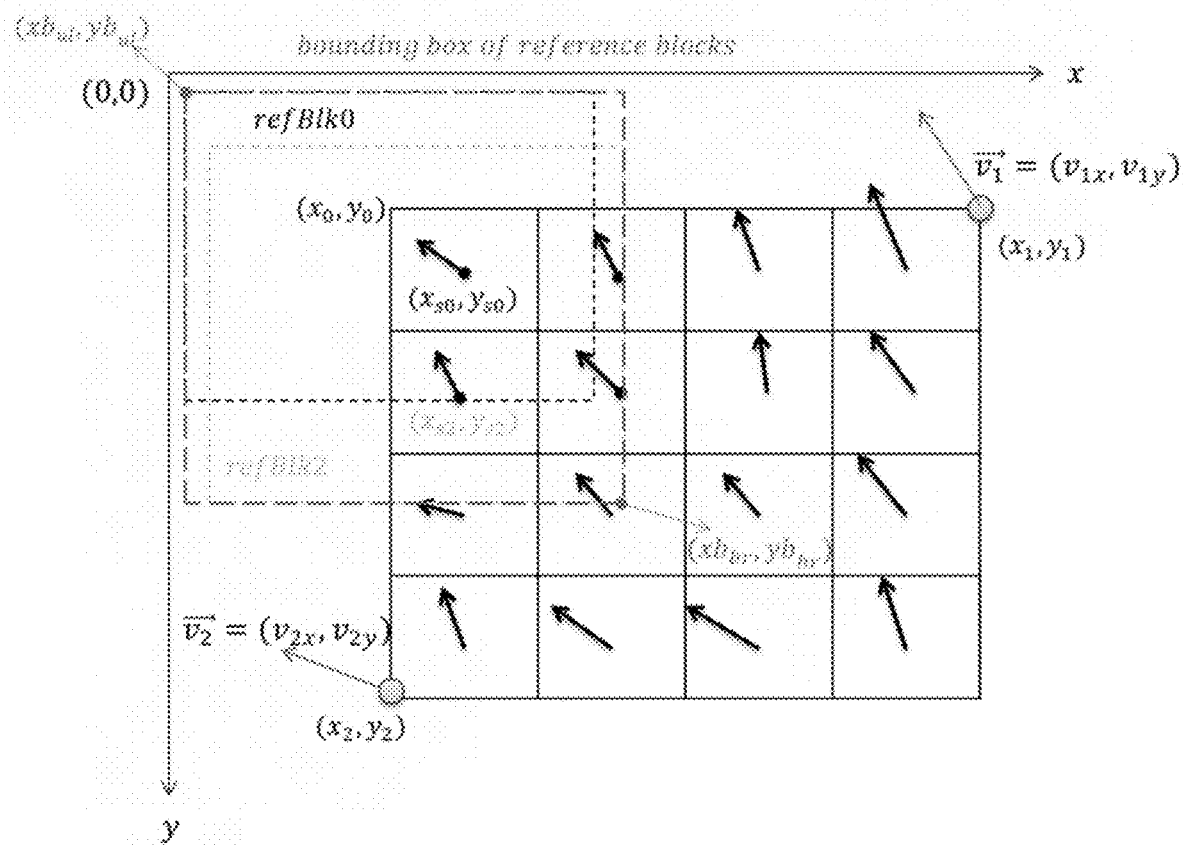
FIG. 5 shows a reference block bounding box of 2 sub-block motion vectors in a PU coded in affine mode and unidirectional inter prediction (vertical direction)

If the PU coded in affine mode uses unidirectional inter prediction, the reference block bounding box can also be drawn in the vertical direction. FIG. 5 shows a reference block bounding box of 2 sub-block motion vectors in a PU coded in affine mode and unidirectional inter prediction (vertical direction). As shown in FIG. 5, in this case, the reference block bounding box size, i.e. $(bxW_v, bxH_v)$, can be computed by (see also Table 1 sub-block 0 and 2):

$$\begin{cases} bxW_v = \max(0, cn) - \min(0, cn) + f_x + m - 1 \\ bxH_v = \max(0, (1+d)n) - \min(0, (1+d)n) + f_y + n - 1 \end{cases} \quad \text{Equation 14}$$

From Equation 12, Equation 13 and Equation 14, it can be seen that the reference block bounding block size is independent of sub-block locations inside the PU; it purely depends on the parameters of the affine motion model (i.e.

a, b, c, d), sub-block size (i.e. m*n) and filter tap lengths (i.e. $f_x*f_y$) used for motion compensation.

In the current VVC design (JVET-P2001), the sub-block size used for the affine mode is 4×4 (i.e. m=n=4), and the filter tap used for luma motion compensation of the affine mode is 6×6 (i.e. $f_x=f_y=6$). The reference block bounding box sizes for the VVC are defined in Equations 15, 16 and 17.

$$\begin{cases} bxW4 = \max(0, 4(1+a), 4c, 4(1+a)+4c) - \\ \min(0, 4(1+a), 4c, 4(1+a)+4c) + 9 \\ bxH4 = \max(0, 4b, 4(1+d), 4b+4(1+d)) - \\ \min(0, 4b, 4(1+d), 4b+4(1+d)) + 9 \end{cases} \quad \text{Equation 15}$$

$$\begin{cases} bxW_h = \max(0, 4(1+a)) - \min(0, 4(1+a)) + 9 \\ bxH_h = \max(0, 4b) - \min(0, 4b) + 9 \end{cases} \quad \text{Equation 16}$$

$$\begin{cases} bxW_v = \max(0, 4c) - \min(0, 4c) + 9 \\ bxH_v = \max(0, 4(1+d)) - \min(0, 4(1+d)) + 9 \end{cases} \quad \text{Equation 17}$$

Now that the above concepts of reference block bounding box computation have been explained, various aspects of the disclosed subject matter using some or all of these concepts will be further described herein.

Figure 6:
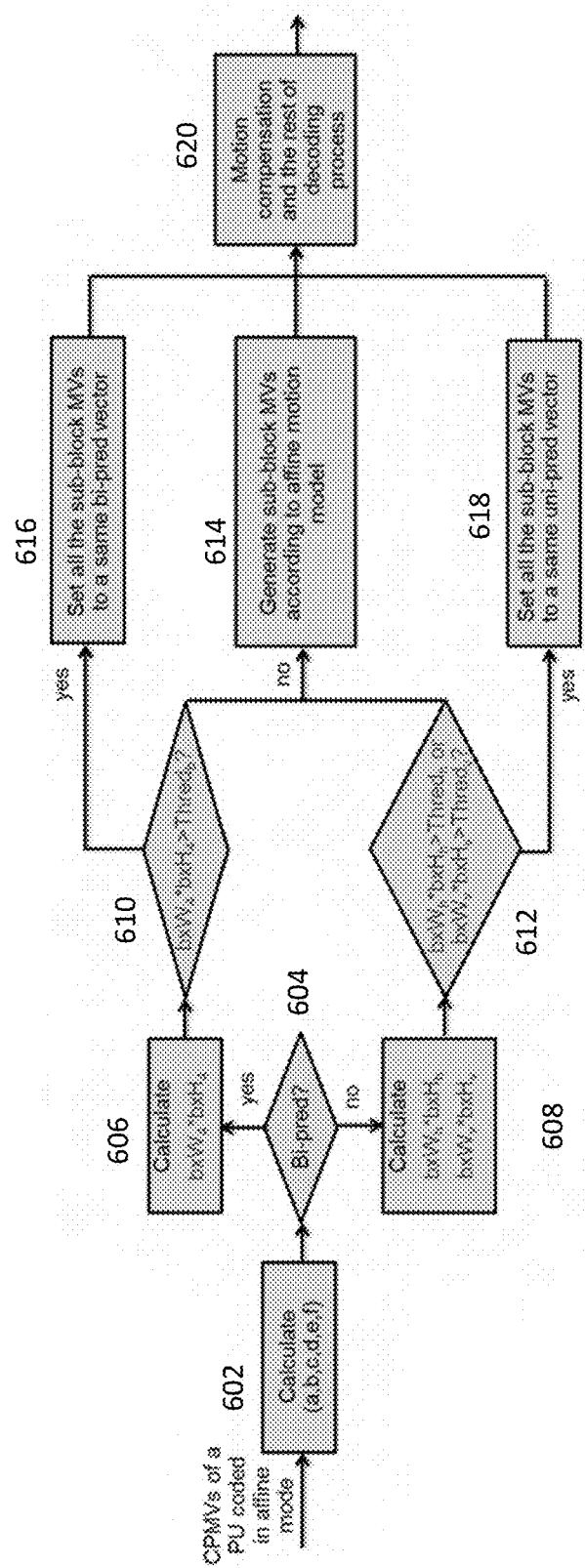
FIG. 6 is an algorithmic flow chart of a method for controlling memory bandwidth consumption of the affine mode according to one or more aspects of the disclosed subject matter.

FIG. 6 is an algorithmic flow chart of a method for controlling memory bandwidth consumption of the affine mode. Based on the CPMVs (control point motion vectors) received for the PU, the decoder computes the reference block bounding box size and switches to the fallback mode (from the affine mode) if the reference blocking box size exceeds the pre-defined thresholds. In this variant, the reference block bounding box is computed for 2×2 sub-block vectors if the PU uses bidirectional affine mode, and for 2×1 and 1×2 sub-block vectors if the PU uses unidirectional affine mode. In one implementation, the following steps may be applied:

1. Based on the CPMVs of the PU, the affine motion model parameters (a, b, c, d, e, f) are computed in step 602.

2. If it is determined in step 604 that the PU uses bi-directional affine mode (i.e. bi-pred), the reference block bounding box size bxW4*bxH4 of 2×2 sub-block vectors is computed in step 606 by:

$$\begin{cases} bxW4 = \max(0, 1+a)m, cn, (1+a)m+cn) - \\ \min(0, (1+a)m, cn, (1+a)m+cn) + f_x + m - 1 \\ bxH4 = \max(0, bm, (1+d)n, bm+(1+d)n) - \\ \min(0, bm, (1+d)n, bm+(1+d)n) + f_y + n - 1 \end{cases}$$

where m*n is the sub-block size, and $f_x*f_y$ is the filter tap size used in the luma motion compensation.

3. If the PU uses unidirectional affine mode (i.e. uni-pred), the reference block bounding box size $bxW_h*bxH_h$ of 2×1 sub-block vectors and the reference block bounding box size $bxW_v*bxH_v$ of 1×2 sub-block vectors are computed in step 608 by:

$$\begin{cases} bxW_h = \max(0, (1+a)m) - \min(0, (1+a)m) + f_x + m - 1 \\ bxH_h = \max(0, bm) - \min(0, bm) + f_y + n - 1 \end{cases}$$

$$\begin{cases} bxW_v = \max(0, cn) - \min(0, cn) + f_x + m - 1 \\ bxH_v = \max(0, (1+d)n) - \min(0, (1+d)n) + f_y + n - 1 \end{cases}$$

where m*n is the sub-block size, and $f_x*f_y$ is the filter tap size used in the luma motion compensation of the affine mode.

4. Thresholds $Thred_b$, $Thred_h$ and $Thred_v$ may be set to values defined by:

$$\begin{cases} Thred_b = (f_x + 2m - 1 + \delta_x)*(f_y + 2n - 1 + \delta_y) \\ Thred_h = (f_x + 2m - 1 + \delta_x)*(f_y + n - 1 + \delta_y) \\ Thred_v = (f_x + m - 1 + \delta_x)*(f_y + 2n - 1 + \delta_y) \end{cases} \quad \text{Equation 18}$$

where $\delta_x*\delta_y>0$ defines the margin for controlling the memory bandwidth consumption.

5. If the PU uses bi-directional affine mode (i.e. bi-pred) and it is determined in step 610 that bxW4*bxH4≤$Thred_b$, or if the PU uses unidirectional affine mode (i.e. uni-pred) and it is determined in step 612 that both $bxW_h*bxH_h≤Thred_h$, $bxW_v*bxH_v≤Thred_v$, the sub-block motion vectors of the PU, $\vec{v}=(v_x, v_y)$ at a sample position (x, y), are generated in step 614 by using the affine motion model:

$$\begin{cases} v_x = ax + cy + e \\ v_y = bx + dy + f \end{cases}$$

where (x, y) for a sub-block vector can be the center location of the sub-block.

6. Otherwise (fallback mode), if the PU uses bi-directional affine mode (i.e. bi-pred) and bxW4*bxH4>$Thred_b$, or if the PU uses unidirectional affine mode (i.e. uni-pred) and either $bxW_h*bxH_h>Thred_h$ or $bxW_v*bxH_v>Thred_v$, the fallback mode is triggered, and in a corresponding one of steps 616 and 618, the sub-block motion vectors of the PU, $\vec{v}=(v_x, v_y)$ at a sample position (x, y), are set to a same motion vector. For example, $$\begin{cases} v_x = ax_0 + cy_0 + e \\ v_y = bx_0 + dy_0 + f \end{cases}$$

where $(x_0, y_0)$ is the coordinate of the center point of the PU. $(x_0, y_0)$ can be set to other locations of the PU. For example, if $(x_0, y_0)$ is set to the coordinate of the top-left corner of the PU, then all the sub-block vectors $\vec{v}=(v_x, v_y)$ of the PU are actually set to the control point motion vector of the PU at the top-left PU corner location.

By setting all the sub-block vectors to a same vector, the reference block bounding box size of 2×2, 2×1 and 1×2 sub-block vectors in the fallback mode is $(f_x+2m-1)*(f_y+2n-1)$, $(f_x+2m-1)*(f_y+n-1)$ and $(f_x+m-1)*(f_y+2n-1)$, respectively, which is guaranteed to be smaller than the pre-defined thresholds $Thred_b$, $Thred_h$ and $Thred_v$.

7. The generated sub-block vectors are passed to the motion compensation and the rest of the decoder processing in step 620.

In the affine mode of the current VVC design, the sub-block size is fixed to 4×4 (i.e. m=n=4) and the filter-tap is fixed to 8×8 (i.e. $f_x=f_y=6$). If $\delta_x$ and $\delta_y$ are set to $\delta_x=\delta_y=2$, thresholds $Thred_b$, $Thred_h$ and $Thred_v$ become $$\begin{cases} Thred_b = 15*15 \\ Thred_h = 15*11 \\ Thred_v = 11*15 \end{cases} \quad \text{Equation 19}$$

Which means the memory bandwidth consumption of the affine mode controlled by the algorithm described in FIG. 6 won't exceed the worst case memory bandwidth consumption of the HEVC, which uses 8-tap interpolation filters for the motion compensation of 8×8 bi-directional PUs and 8×4/4×8 unidirectional PUs. The reference block size for an 8×8 directional PU using 8-tap interpolation filters is 15*15 for both the list0 and list1 prediction, and the reference block size for an 8×4/4×8 unidirectional PU is 15*11/11*15 for list0 or list1 prediction. Those values match the thresholds set in Equation 19.

Figure 7:
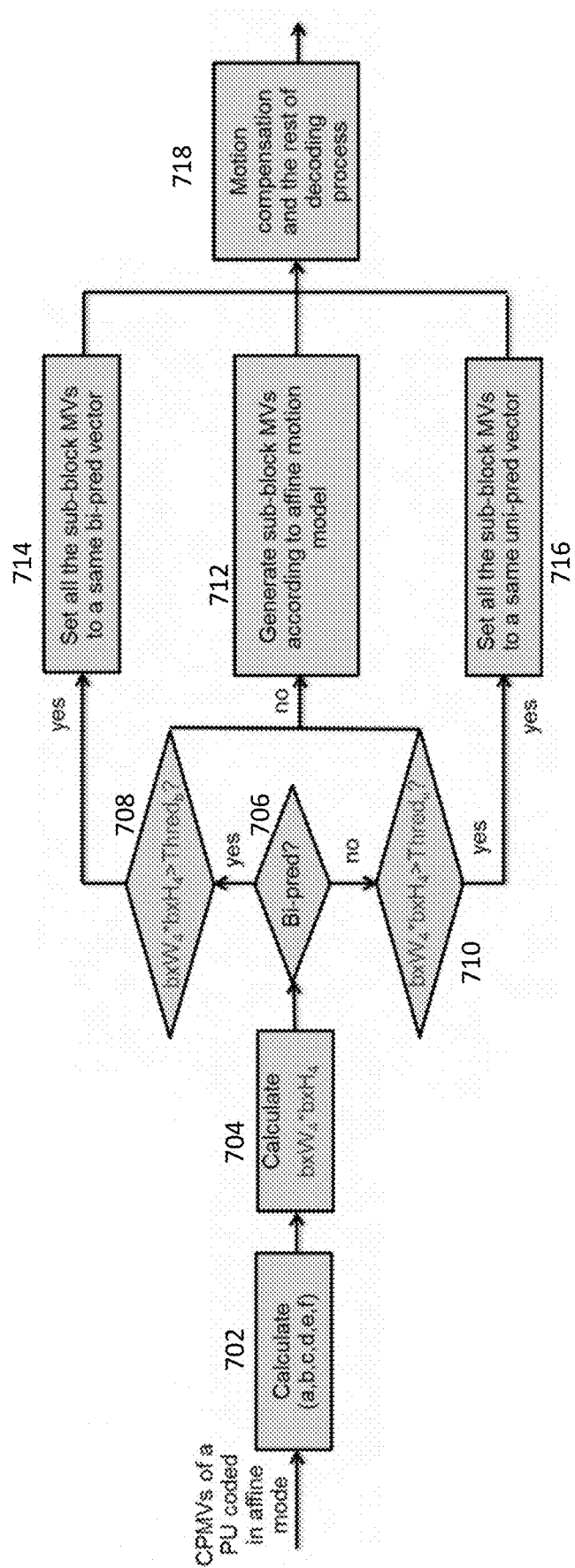
FIG. 7 is an algorithmic flow chart of a method for controlling memory bandwidth consumption of the affine mode according to one or more aspects of the disclosed subject matter.

FIG. 7 is an algorithmic flow chart of a method for controlling memory bandwidth consumption of the affine mode. Based on the CPMVs (control point motion vectors) received for the PU, the decoder computes the reference block bounding box size and switches to the fallback mode (from the affine mode) if the reference blocking box size exceeds the pre-defined thresholds. In this embodiment, the reference block bounding box is always computed for 2×2 sub-block vectors independent of the PU prediction type (unidirectional or bidirectional prediction). In one implementation, the following steps may be applied:

1. Based on the CPMVs of the PU, the affine motion model parameters (a, b, c, d, e, f) are computed in step 702.
2. Compute the reference block bounding box size bxW4*bxH4 of 2×2 sub-block vectors in step 704 by $$\begin{cases} bxW4 = \max(0, (1+a)m, cn, (1+a)m+cn) - \\ \min(0, (1+a)m, cn, (1+a)m+cn) + f_x + m - 1 \\ bxH4 = \max(0, bm, (1+d)n, bm+(1+d)n) - \\ \min(0, bm, (1+d)n, bm+(1+d)n) + f_y + n - 1 \end{cases}$$

where m*n is the sub-block size, and $f_x*f_y$ is the filter tap size used in the luma motion compensation.

3. Thresholds $Thred_b$ and $Thred_u$ may be both set to $(f_x+2m-1+\delta_x)*(f_y+2n-1+\delta_y)$, or set to different values based on prediction type (unidirectional prediction or bi-directional), such as $$\begin{cases} Thred_b = (f_x + 2m - 1 + \delta_x)*(f_y + 2n - 1 + \delta_y) \\ Thred_u = 2*(f_x + 2m - 1 + \delta_x)*(f_y + 2n - 1 + \delta_y) \end{cases}$$

where $\delta_x*\delta_y>0$ defines the margin for controlling the memory bandwidth consumption.

4. If it is determined in step 706 the PU uses bi-directional affine mode (i.e. bi-pred) and it is determined in step 708 that bxW4*bxH4≤$Thred_b$, or if the PU uses unidirectional affine mode (i.e. uni-pred) and it is determined in step 710 that bxW4*bxH4≤$Thred_u$, the sub-block motion vectors of the PU, $\vec{v}=(v_x, v_y)$ at a sample position (x, y), are generated in step 712 by using the affine motion model:

$$\begin{cases} v_x = ax + cy + e \\ v_y = bx + dy + f \end{cases}$$

where (x, y) for a sub-block vector can be the center location of the sub-block.

5. Otherwise (fallback mode), if the PU uses bi-directional affine mode (i.e. bi-pred) and bxW4*bxH4>$Thred_b$, or if the PU uses unidirectional affine mode (i.e. uni-pred) and bxW4*bxH4>$Thred_u$, the fallback mode is triggered in a corresponding one of steps 714 and 716, and the sub-block motion vectors of the PU, $\vec{v}=(v_x, v_y)$ at a sample position (x, y), are set to a same motion vector. For example, $$\begin{cases} v_x = ax_0 + cy_0 + e \\ v_y = bx_0 + dy_0 + f \end{cases}$$

where $(x_0, y_0)$ is the coordinate of the center point of the PU. $(x_0, y_0)$ can be set to other locations of the PU. For example, if $(x_0, y_0)$ is set to the coordinate of the top-left corner of the PU, then all the sub-block vectors $\vec{v}=(v_x, v_y)$ of the PU are actually set to the control point motion vector of the PU at the top-left PU corner location.

By setting all the sub-block vectors to a same vector, the reference block bounding box size of 2×2 sub-block vectors in the fallback mode is $(f_x+2m-1)*(f_y+2n-1)$, which is guaranteed to be smaller than the pre-defined threshold values of $Thred_b$ and $Thred_u$.

6. The generated sub-block vectors are passed to the motion compensation and the rest of the decoder processing in step 718.

It should be appreciated that in the bi-directional affine mode, a PU has both list0 and list1 predictions. In the disclosed subject matter, the reference bounding box size bxW4*bxH4 is computed independently for list0 and list1 prediction with the respective list0/list1 affine motion model parameters (a, b, c, d) of the PU, and the threshold $Thred_b$ is set separately for list0 and list1 prediction (though the values of the threshold could be the same). With the memory bandwidth control algorithms described above, the following four combinations are possible for a PU coded in bi-directional affine mode: 1) the regular sub-block motion vector fields are used for both the list0 and list1 motion compensation of the PU; 2) the regular sub-block motion vector field is used for list0 motion compensation but the fallback mode (i.e. a single vector for list1 prediction of the entire PU) is used for list1 motion compensation; 3) the fallback mode (i.e. a single vector for list0 prediction of the entire PU) is used for list0 motion compensation but the regular sub-block motion vector field is used for list1 motion compensation; and 4) the fallback mode (i.e. a first single vector for list0 prediction and a second single vector for list1 prediction of the entire PU) is used for both list0 and list1 motion compensation.

Figure 8:
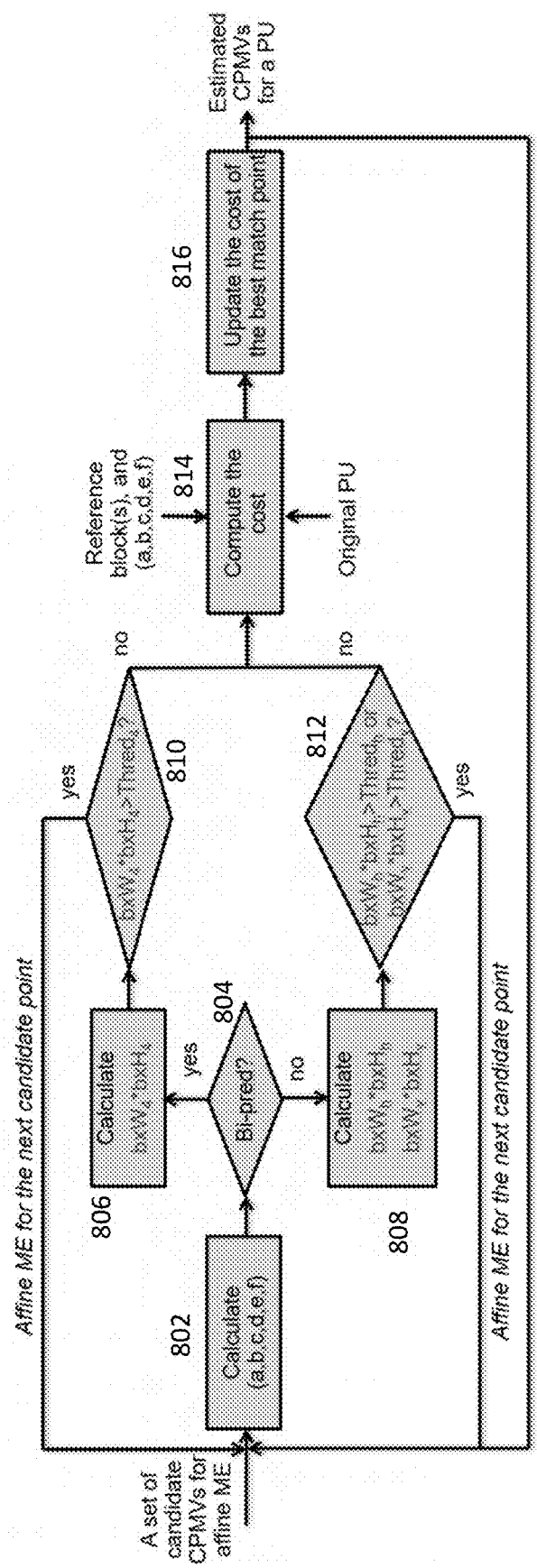
FIG. 8 is an algorithmic flow chart of a method for controlling the sub-block motion vector spread in the affine motion estimation on the encoder side according to one or more aspects of the disclosed subject matter.

FIG. 8 is an algorithmic flow chart of a method for controlling the sub-block motion vector spread in the affine motion estimation on the encoder side. The basic idea is to constrain the sub-block motion vector spread at PU level. The sub-block motion vector spread can be measured by using the reference block bounding box size. During the encoder decision process, the encoder guarantees that the affine mode, if it is selected for a PU, has the sub-block motion vector spread constrained to meet the pre-defined budget of the worst-case memory bandwidth consumption at PU level. During the affine motion estimation in which a set of candidate CPMVs (control point motion vectors) is evaluated for the affine mode of the PU, the following steps may be applied:

1. Based on the CPMVs of a candidate point, the affine motion model parameters (a, b, c, d, e, f) are computed in step 802.

2. If the PU uses bi-directional affine mode (i.e. bi-pred), as determined in step 804, the reference bounding box size bxW4*bxH4 is computed in step 806 by using Equation 12. Otherwise, if the PU uses unidirectional affine mode, the reference bounding box size bxW$_h$*bxH$_h$ and bxW$_v$*bxH$_v$ are computed in step 808 by using Equation 13 and Equation 14, respectively.

3. To control the sub-block motion vector spread at PU level, the current candidate point is skipped for cost evaluation in the following cases:

a. If, as determined in step 810, the PU uses bi-directional affine mode (i.e. bi-pred) and bxW4*bxH4>Thred4.

b. Or if, as determined in step 812, the PU uses uni-directional affine mode and either bxW$_h$*bxH$_h$>Thred$_h$ or bxW$_v$*bxH$_v$>Thred$_v$, where Thred4, Thred$_h$ and Thred$_v$ may be pre-defined by using Equation 18.

4. Otherwise, the cost of the current candidate point is computed in step 814 by using the affine motion model parameters (a, b, c, d, e, f), the reference block data and the original PU data.

5. The cost of the best match point is then updated in step 816.

6. Repeat steps 802 through 816 to loop through all the candidate points for the PU to obtain the estimated CPMVs for the PU that deliver the best rate-distortion cost.

The estimated affine CPMVs for the PU, if available, may be further evaluated against the costs of regular motion vectors and intra prediction mode estimated for the PU to decide whether the current PU should be encoded in the affine mode.

By using the proposed method, the worst-case memory bandwidth consumption for the affine mode is restricted not only at sub-block level but also at PU level. Note that the sub-block motion vector spread within a PU of affine mode is determined by the affine parameters (a, b, c, d).

It should be appreciated that in in step 810 the decision on whether the reference bounding box size exceeds the pre-defined threshold is done independently for the list0 and list1 prediction of a PU coded in bi-directional affine mode.

The restriction can also be imposed by a bitstream constraint. For example, the bitstream constraint can be specified as follows:

A bitstream conforming to the VVC standard shall satisfy the following conditions:

1. If the PU uses bi-directional affine mode (i.e. bi-pred), the reference block bounding box size bxW4*bxH4 is less than or equal to Thred4.

2. Otherwise, if the PU uses uni-directional affine mode, the reference block bounding box size bxW$_h$ *bxH$_h$ and bxW$_v$*bxH$_v$ is less than or equal to Thred$_h$ and hred$_v$, respectively.

The implementation depicted in FIG. 8 just exhibits one example of the embodiment; other variants can be implemented. For example:

1. Instead of using the bounding boxes in both the horizontal direction (i.e. bxW$_h$, bxH$_h$ and Thred$_h$) and the vertical direction (i.e. bxW$_v$, bxH$_v$ and Thred$_v$) in the case of unidirectional affine mode, the bounding box either in the horizontal or in the vertical direction may be used.

2. Instead of computing the threshold and bounding box size for 4 sub-block vectors (2×2 consecutive sub-block vectors) in the case of bi-directional affine mode, and for 2 sub-block vectors (in horizontal and/or vertical direction) in the case of unidirectional affine mode, the threshold and bounding box size may be computed for other numbers of consecutive sub-block vectors with a PU.

3. The constraint may be imposed independent of the prediction type (i.e. bi-directional or unidirectional affine mode). In one implementation, the constraint may be simply expressed as a bitstream conforming to the VVC standard shall stratify that the reference block bounding box size bxW4*bxH4 is less than or equal to Thred4.

4. Instead of using the fixed sub-block size m*n (e. g. 4×4), the sub-block size may be further made adaptive to impose additional constraints at the sub-block level.

Figure 9:
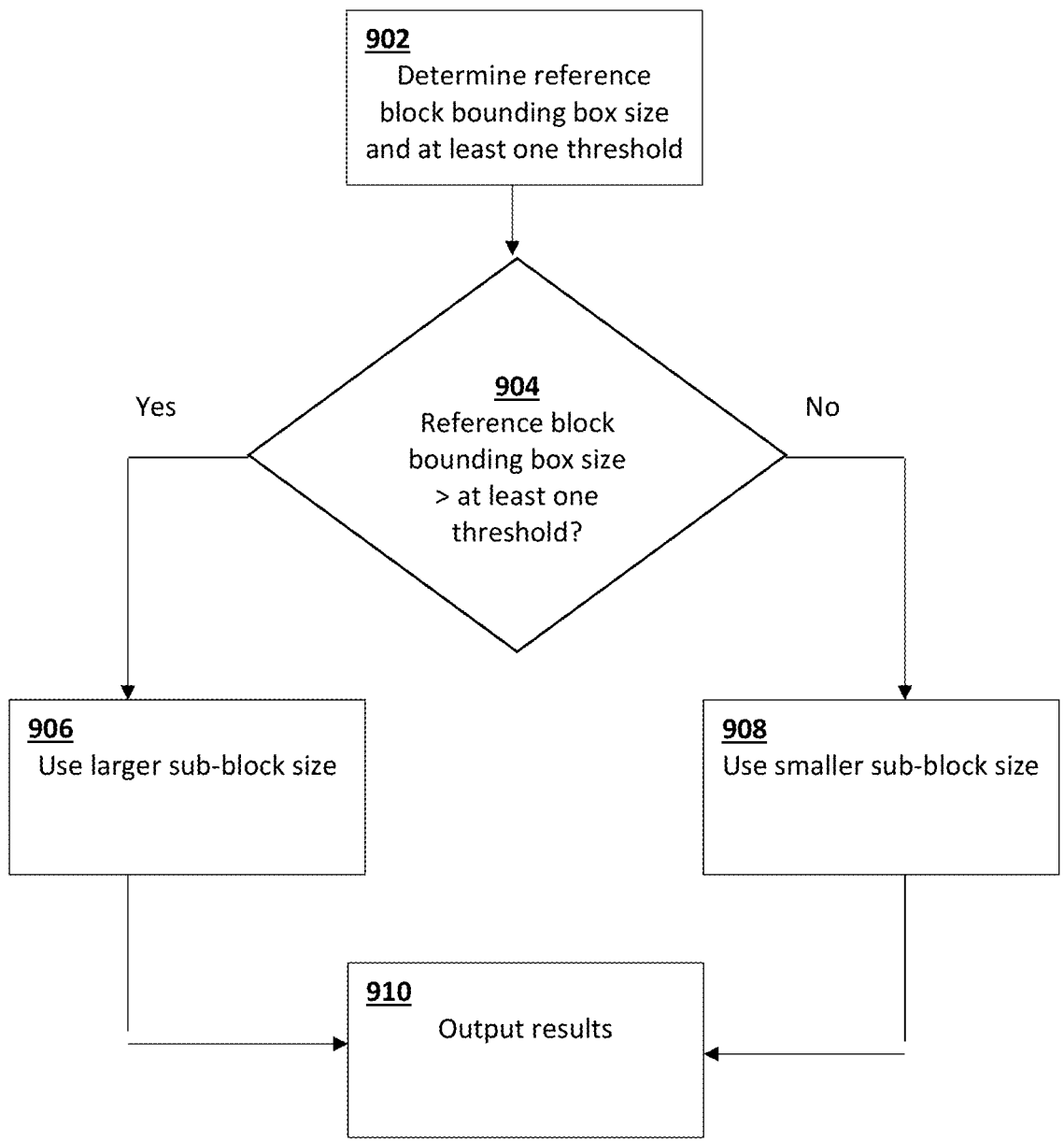
FIG. 9 is an algorithmic flow chart of a method for determining block size according to one or more aspects of the disclosed subject matter.

FIG. 9 is an algorithmic flow chart of a method for determining block size. In step 902, the reference block bounding box size and the at least one threshold are determined. In step 904, the reference block bounding box size and the at least one threshold are compared. If the reference block bounding size exceeds the at least one threshold, then in step 906, the sub-block size m'*n' (or as appropriate, m'*n or m*n', with m'>m, and n'>n) is used for the generation of the affine sub-block motion vector field and for affine motion compensation. Otherwise, in step 908, the sub-block size m*n is used. Any combination of bi-directional, horizontal unidirectional and vertical unidirectional modes can be used. The results are output in step 910.

For example, the memory bandwidth control algorithm can be modified based on the shape of the PU coded in the affine mode:

1. If the PU coded in affine mode uses bi-directional inter prediction and the reference block bounding box size of four sub-block vectors exceeds a pre-defined threshold, i.e. bxW4*bxH4>Thred4, then sub-block size m'*n' (with m'>m, and n'>n) is used for the generation of the sub-block motion data field for the motion compensation of the PU. Otherwise, sub-block size m*n is used.

2. Otherwise, if the PU coded in affine mode uses unidirectional inter prediction, and if the reference block bounding box size of two sub-block vectors exceeds a pre-defined threshold in both horizontal and vertical directions, i.e. bxW$_h$*bxH$_h$>Thred$_h$ and bxW$_v$*bxH$_v$22 Thred$_v$, then sub-block size m'*n (with m'>m) is used if PU width is larger than PU height, or sub-block size m*n' (with n'>n) is used PU width is less than or equal to PU height.

Otherwise, sub-block size m*n is used for the generation of the sub-block motion data field for the motion compensation of the PU.

In another variation, instead of adaptively selecting the sub-block size based on the size of reference block bounding box, the selection may be based on the width and/or height of the reference block bounding box, and/or based on the DDR burst size and alignments, or based on any combinations of above mentioned parameters (i.e. size, with and height of the reference block bounding box, the DDR burst size and alignments, and etc.).

It should be appreciated that in the disclosed matter the bitstream constraints and/or sub-block size adaptation are done independently for the list0 and list1 prediction of a PU coded in bi-directional affine mode.

In another variation, the sub-block vectors of affine mode used for motion compensation may be the same as or different from the ones used for (affine) merge/AMVP list derivation (used as spatial neighboring candidates), for de-blocking filter and for storage of temporal motion vectors (TMVPs). For example, the sub-block motion vectors of the affine mode for motion compensation may be generated by the algorithm that adaptively selects sub-block sizes (e.g. 8×8/8×4 adaptively), while the sub-block motion vectors of the affine mode for (affine) merge/AMVP list derivation (used as spatial neighboring candidates), for de-blocking filter and for storage of temporal motion vectors (TMVPs) may be generated by using a fixed sub-block size (e.g. 4×4). In another example, the sub-block motion vectors of the affine mode for motion compensation, for (affine) merge/ AMVP list derivation (used as spatial neighboring candidates), for de-blocking filter and for storage of temporal motion vectors (TMVPs) may be generated by the algorithm described herein that adaptively selects sub-block sizes (e.g. 8×8/8×4 adaptively).

Figure 10:
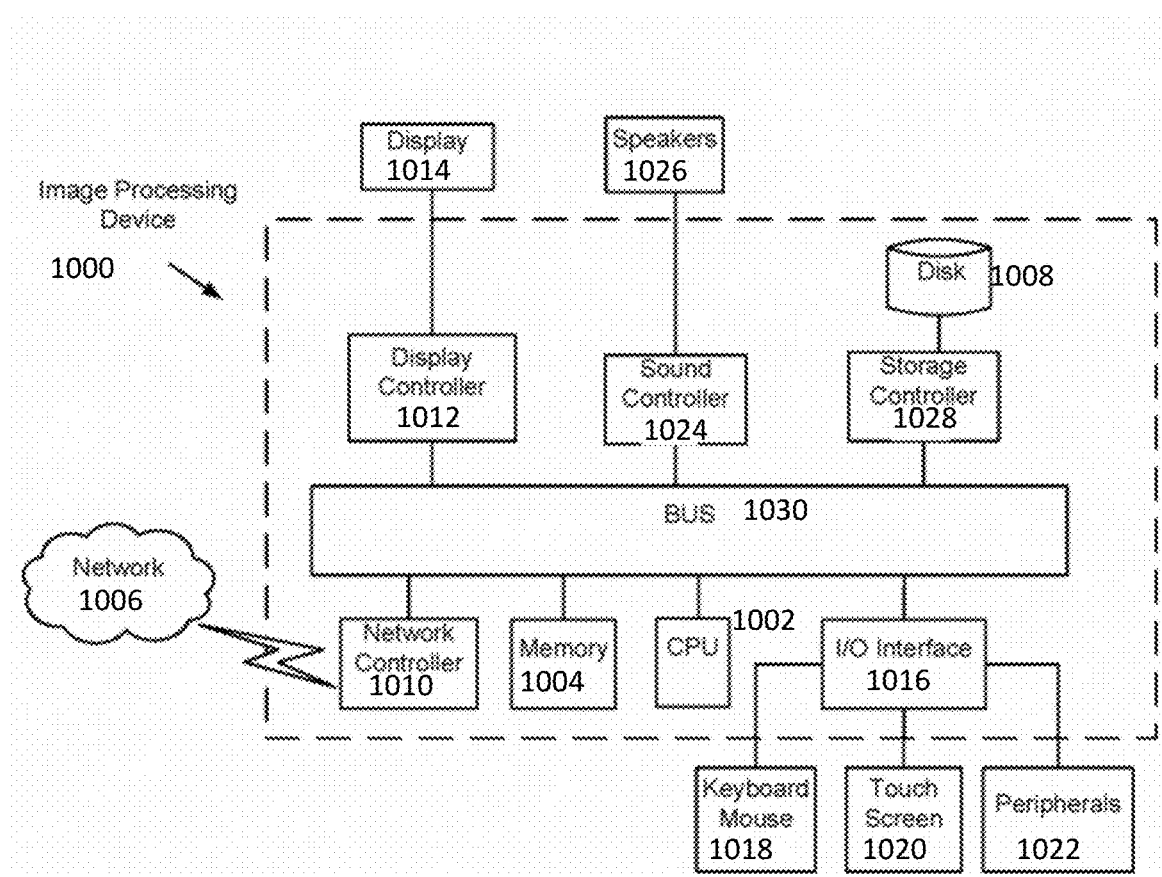
FIG. 10 is a block diagram showing an example of circuitry on which any of the preferred embodiments, or any other embodiment, can be implemented.

A hardware description of a computer/device (e.g., the image processing device 1000) according to exemplary embodiments, or any other embodiment, which is used to encode and/or decode video is described with reference to FIG. 10. In FIG. 10, the image processing device 1000 includes a CPU 1002 which performs one or more of the processes described above. The process data and instructions may be stored in memory 1004, which may be transitory, non-transitory, or a combination of the two. The video (data) to be encoded/decoded can original from any source such as an external memory, a network 1006, or other location/device. These processes and instructions may also be stored on a storage medium disk 1008 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the image processing device 1000 communicates, such as an image processing device or computer.

Further, the claimed advancements may be provided as a utility application, background daemon, or component of an operating system, or combination thereof, executing in conjunction with CPU 1002 and an operating system such as Microsoft Windows, UNIX, Solaris, LINUX, Apple MAC-OS and other suitable operating system.

The image processing device 1000 may be a general-purpose computer or a particular, special-purpose machine. In one embodiment, the image processing device 1000 becomes a particular, special-purpose machine when the processor 1002 is programmed to perform network performance testing. The image processing device may be implemented as an encoder, a decoder, or a device which both encodes and decodes images. The image processing device can be implemented in a mobile phone, a laptop, a tablet, a general purpose computer, a set-top box, a video decoding device such as an Amazon Fire TV Stick or device, a Roku device, a television, a video monitor, a still camera, a video camera, a scanner, a multifunction printer, an automobile display, or any desired device.

Alternatively, or additionally, the CPU 1002 may be implemented on an FPGA, ASIC, PLD or using discrete logic circuits, as one of ordinary skill in the art would recognize. Further, CPU 1002 may be implemented as multiple processors cooperatively working in parallel to perform the instructions of the inventive processes described above.

The image processing device 1000 in FIG. 10 also includes a network controller 1010, such as an Intel Ethernet PRO network interface card from Intel Corporation of America, for interfacing with network 1006. As can be appreciated, the network 1006 can be a public network, such as the Internet, or a private network such as an LAN or WAN network, or any combination thereof and can also include PSTN or ISDN sub-networks. The network 1006 can also be wired, such as an Ethernet network, or can be wireless such as a cellular network including EDGE, 3G and 4G wireless cellular systems. The wireless network can also be WiFi, Bluetooth, or any other wireless form of communication that is known.

The image processing device 1000 further includes a display controller 1012, such as a graphics card or graphics adaptor for interfacing with display 1014, such as a monitor. A general purpose I/O interface 1016 interfaces with a keyboard and/or mouse 1018 as well as a touch screen panel 1020 on or separate from display 1014. General purpose I/O interface also connects to a variety of peripherals 1022 including printers and scanners.

A sound controller 1024 is also provided in the image processing device 1000 to interface with speakers/microphone 1026 thereby providing sounds and/or music.

The general-purpose storage controller 1028 connects the storage medium disk 1008 with communication bus 1030, which may be an ISA, EISA, VESA, PCI, or similar, for interconnecting all of the components of the image processing device 1000. A description of the general features and functionality of the display 1014, keyboard and/or mouse 1018, as well as the display controller 1012, storage controller 1028, network controller 1010, sound controller 1024, and general purpose I/O interface 1016 is omitted herein for brevity.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset. For that matter, any hardware and/or software capable of implementing any of the above embodiments, or any other embodiment, can be used instead of, or in addition to, what is disclosed above.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

While preferred embodiments have been set forth above, those skilled in the art who have reviewed the present disclosure will readily appreciate that other embodiments can be realized within the scope of the disclosure. For example, disclosures of numerical values and of specific technologies are illustrative rather than limiting. Also, whenever technically feasible, features from different embodiments can be combined, and the order in which operations are performed can be varied. Further, wherever technically feasible, any feature disclosed herein can be used for encoding, decoding or both. The one or more aspects of the disclosed subject matter are not limited to VVC implementations and can be utilized with any video encoding/decoding system. Therefore, the one or more aspects of the disclosed subject matter should be construed as limited only by the appended claims.

What is claimed is:

1. A computing system for video encoding or decoding, comprising:
a circuitry configured to
input a digital video;
perform an encoding or a decoding of the digital video which has been input; and
output the digital video which has been encoded or decoded, wherein:
the encoding or the decoding includes performing an affine motion compensation in an affine mode in which a prediction unit ("PU") of the digital video coded in the affine mode uses inter prediction and a reference block bounding box size and determining whether the reference block bounding box size exceeds at least one predetermined threshold, wherein the reference block bounding box size is independent of sub-block locations inside the PU, wherein the circuitry is further configured to
calculate the reference block bounding box size by determining coordinates of an upper-left and a bottom-right corner of the reference block bounding box of a plurality of consecutive sub-block vectors of the PU, and calculate a width and a height of the reference block bounding box based on the coordinates of the upper-left and the bottom-right corner of the reference bounding block, wherein the plurality of consecutive sub-block vectors includes a first number of sub-block vectors when the prediction unit uses unidirectional prediction and the plurality of consecutive sub-block vectors includes a second different number of sub-block vectors when the prediction unit uses bidirectional prediction;
in response to a determination that the reference block bounding box size exceeds the at least one predetermined threshold, the affine motion compensation is performed using a first motion compensation operation, wherein the at least one predetermined threshold is set to a first value when the prediction unit uses the bidirectional prediction and the at least one predetermined threshold is set to a second different value when the prediction unit uses the unidirectional prediction; and
in response to a determination that the reference block bounding box size does not exceed the at least one predetermined threshold, the affine motion compensation is performed using a second motion compensation operation that is different from the first motion compensation operation.

2. The computing system of claim 1, wherein the circuitry is further configured to
calculate the reference block bounding box size to determine whether the reference block bounding box size exceeds the at least one predetermined threshold, and
perform the first motion compensation operation or the second motion compensation operation in response to a determination separately for list0 and list1 prediction of the PU.

3. The computing system of claim 1, wherein, in the first motion compensation operation, all sub-block vectors of the PU are set to a same vector, the same vector being an affine motion vector for a single point in the PU.

4. The computing system of claim 1, wherein, in the second motion compensation operation, an affine sub-block motion vector field for the affine motion compensation is generated based on a sub-block size.

5. The computing system of claim 1, wherein, in the first motion compensation operation, an affine sub-block motion vector field for the affine motion compensation is generated by using a larger sub-block size.

6. The computing system of claim 1, wherein the circuitry is further configured to
select control point motion vectors for the PU so that a resulting reference block bounding box size does not exceed one or more predetermined thresholds.

7. A method of video encoding or decoding, comprising:
inputting a digital video;
performing an encoding or a decoding of the digital video which has been input; and
outputting the digital video which has been encoded or decoded, wherein:
the encoding or the decoding includes performing an affine motion compensation in an affine mode in which a prediction unit ("PU") of the digital video coded in the affine mode uses inter prediction and a reference block bounding box size and determining whether the reference block bounding box size exceeds at least one predetermined threshold, wherein the reference block bounding box size is independent of sub-block locations inside the PU, wherein the method further comprises:
calculating the reference block bounding box size by determining coordinates of an upper-left and a bottom-right corner of the reference block bounding box of a plurality of consecutive sub-block vectors of the PU, and calculating a width and a height of the reference block bounding box based on the coordinates of the upper-left and the bottom-right corner of the reference bounding block, wherein the plurality of consecutive sub-block vectors includes a first number of sub-block vectors when the prediction unit uses unidirectional prediction and the plurality of consecutive sub-block vectors includes a second different number of sub-block vectors when the prediction unit uses bidirectional prediction;
in response to a determination that the reference block bounding box size exceeds the at least one predetermined threshold, the affine motion compensation is performed using a first motion compensation operation, wherein the at least one predetermined threshold is set to a first value when the prediction unit uses the bidirectional prediction and the at least one predetermined threshold is set to a second different value when the prediction unit uses the unidirectional prediction; and
in response to a determination that the reference block bounding box size does not exceed the at least one predetermined threshold, the affine motion compensation is performed using a second motion compensation operation that is different from the first motion compensation operation.

8. The method of claim 7, further comprising:
calculating the reference block bounding box to
determine whether the reference block bounding box size exceeds the at least one predetermined threshold; and
perform the first motion compensation operation or the second motion compensation operation in response to a determination separately for list0 and list1 prediction of the PU.

9. The method of claim 7, wherein, in the first motion compensation operation, all sub-block vectors of the PU are set to a same vector, the same vector being an affine motion vector for a single point in the PU.

10. The method of claim 7, wherein, in the second motion compensation operation, an affine sub-block motion vector field for the affine motion compensation is generated based on a sub-block size.

11. The method of claim 7, wherein, in the first motion compensation operation, an affine sub-block motion vector field for the affine motion compensation is generated by using a large sub-block size.

12. The method of claim 7, further comprising:
selecting control point motion vectors for the PU so that a resulting reference block bounding box size does not exceed one or more predetermined thresholds.

13. A non-transitory, computer-readable storage medium storing instructions that, when executed on one or more processors, control the one or more processors to perform a method of video encoding or decoding, comprising:
inputting a digital video;
performing an encoding or a decoding of the digital video which has been input; and
outputting the digital video which has been encoded or decoded, wherein:
the encoding or decoding includes performing an affine motion compensation in an affine mode in which a prediction unit ("PU") of the digital video coded in the affine mode uses inter prediction and a reference block bounding box size and determining whether the reference block bounding box size exceeds at least one predetermined threshold, wherein the reference block bounding box size is independent of sub-block locations inside the PU, wherein the method further comprises:
calculating the reference block bounding box size by determining coordinates of an upper-left and a bottom-right corner of the reference block bounding box of a plurality of consecutive sub-block vectors of the PU, and calculating a width and a height of the reference block bounding box based on the coordinates of the upper-left and the bottom-right corner of the reference bounding block, wherein the plurality of consecutive sub-block vectors includes a first number of sub-block vectors when the prediction unit uses unidirectional prediction and the plurality of consecutive sub-block vectors includes a second different number of sub-block vectors when the prediction unit uses bidirectional prediction;
in response to a determination that the reference block bounding box size exceeds the at least one predetermined threshold, the affine motion compensation is performed using a first motion compensation operation, wherein the at least one predetermined threshold is set to a first value when the prediction unit uses the bidirectional prediction and the at least one predetermined threshold is set to a second different value when the prediction unit uses unidirectional prediction; and
in response to a determination that the reference block bounding box size does not exceed the at least one predetermined threshold, the affine motion compensation is performed using a second motion compensation operation that is different from the first motion compensation operation.

* * * * *